United States Patent
Tung

(10) Patent No.: US 8,954,024 B2
(45) Date of Patent: Feb. 10, 2015

(54) FULL DUPLEX WIRELESS METHOD AND APPARATUS

(75) Inventor: Chien-Cheng Tung, San Ramon, CA (US)

(73) Assignee: Chien-Cheng Tung, San Ramon, CA (US)

( * ) Notice: Subject to any disclaimer, the term of this patent is extended or adjusted under 35 U.S.C. 154(b) by 204 days.

(21) Appl. No.: 13/436,742

(22) Filed: Mar. 30, 2012

(65) Prior Publication Data

US 2012/0263078 A1    Oct. 18, 2012

Related U.S. Application Data

(60) Provisional application No. 61/470,290, filed on Mar. 31, 2011.

(51) Int. Cl.
| H04B 1/10 | (2006.01) |
| H04B 7/155 | (2006.01) |
| H04B 7/04 | (2006.01) |

(52) U.S. Cl.
CPC .......... *H04B 7/15564* (2013.01); *H04B 7/0413* (2013.01)
USPC ..................... 455/278.1; 455/296; 375/346

(58) Field of Classification Search
USPC ............... 455/11, 15, 24, 63.1, 67.11, 550.1, 455/562.1, 276.1, 278.1, 296; 375/284, 375/346, 349
See application file for complete search history.

(56) References Cited

U.S. PATENT DOCUMENTS

| 6,771,931 B2 * | 8/2004 | Waltho ............................ 455/24 |
| 7,096,042 B2 * | 8/2006 | Marinier .................... 455/562.1 |
| 7,349,505 B2 * | 3/2008 | Blount et al. ................. 375/346 |
| 7,738,586 B2 * | 6/2010 | Landmark ..................... 375/284 |

* cited by examiner

*Primary Examiner* — Thanh Le
(74) *Attorney, Agent, or Firm* — Maryam Imam; IPxLaw Group LLP

(57) ABSTRACT

A full duplex wireless system is employed for communicating data between an access point and a client. The full duplex wireless system includes a receive path configured to receive radio frequency data, including self interference, from an antenna and generates baseband output to a demodulator, the receive path includes a combiner that combines the received radio frequency with a self interference canceller path output to generate a combiner output. Further, a self interference tracking path is configured to receive the combiner output and to generate a self interference tracking path output, the self interference tracking path converts the combiner output to baseband and tracks the self-interference. Additionally, a self interference canceller path receives the self interference tracking path output and generates the self interference canceller path output that is at radio frequency (RF).

17 Claims, 16 Drawing Sheets

Double transmitting antennas for antenna cancellation.

Transmit and receive antenna can be shared under wireless relay over half duplex wireless protocol.

Antenna cancellation for full duplex wireless relay with half duplex 4T2R wireless protocol.

8 antennas inside the inner block can be used for full duplex wireless relay over full duplex 2T1R wireless protocol.
16 antennas inside the outer block can be used for full duplex wireless relay over full duplex 4T2R wireless protocol.

FULL DUPLEX WIRELESS METHOD AND APPARATUS

CROSS REFERENCE TO RELATED APPLICATIONS

This application claims priority to U.S. Provisional Patent Application No. 61/470,290, filed on Mar. 31, 2011, by Chien-Cheng Tung and entitled "FULL DUPLEX WIRELESS METHOD AND APPARATUS".

BACKGROUND OF THE INVENTION

1. Field of the Invention

The present invention relates generally to wireless communication systems, and, more particularly, to full-duplex wireless transmitters and receivers.

2. Description of the Prior Art

In the area of wireless communication systems, whose applications are varied and wide, typically half-duplex technology was and is currently employed. A half-duplex technology provides communication in both directions, but only one direction at a time (not simultaneously). Typically, once a party begins receiving a signal, it must wait for the transmitter to stop transmitting, before replying. Accordingly, half-duplex technology restricts the throughput that can be realized by using full-duplex technology.

Multi-input-multi-output (MIMO) systems, employing multiple antennas, are typically used for wireless applications, however, under severe shadowing environment, not only is throughput limited, the distance the signal can reach is also limited. For example, in home environments, because of room partitions and fewer windows, a transmitted signal cannot reach its destination if it has to travel far. Therefore, wireless relays are employed and serve as repeaters to extend the range of the signal. But because a single channel is used for communication, the relay reduces throughput by half.

A full-duplex technology allows communication in both directions, and, unlike half-duplex, allows this to happen simultaneously. Land-line telephone networks are full-duplex, since they allow both callers to speak and be heard at the same time. A good analogy for a full-duplex system would be a two-lane road with one lane for each direction.

Attempts at considering using full-duplex for wireless communications have stalled due to current full-duplex designs requirement for a sharp filter resulting in unbearable increased costs for use in wireless devices, such as smart phones and the like.

Further, current full-duplex considerations use the radio frequency (RF) signal to cancel "self interference". Self interference is the constructive or destructive interference resulting from reception of echoes of the original signal, which has the undesirable effect of fading. It is expensive and challenging to cancel self interference at RF levels. A more extensive explanation of prior art techniques and limitations follows.

Just like Internet has been the major driving force of the prosperity of information technology, wireless has been the same force of the growth of communication industry over the past decade. But nothing is going to be more explosive than the marriage of Internet and wireless for growing trends into a so-called "wireless Internet tsunami". Fashion leading wireless Internet products and services like Apple's iPhone and iPad, Google's Andriod devices, and Netflix's movie streaming from Internet are just the precursors of the wireless Internet tsunami.

To support such phenomenon growth, wireless industry also generates a large quantity of innovations, most noticeable 802.11n in indoor wireless Local Area Network (LAN) area and the coming 4G in outdoor wireless service area. The fundamental innovations of both 802.11n and 4G are all about exploring the capacity of multiple antennas at reflective wireless space, MIMO technology. While MIMO in 4G is still evolving and under-developed, MIMO in 802.11n has gone through fairly extensive field tests. It is now fair to say on one hand MIMO has created noticeable gains and merits on the other hand MIMO has failed to deliver some of its promised service, as discussed below. It is believed that similarly 4G cannot depend on MIMO technology alone to fulfill the demands of new wireless service.

In all sorts of applications and services, video streaming probably is one of the most demanding services to test the underlying Internet and wireless technologies. For example, one of the design targets of 802.11n has been described as "to deliver three HD video streaming around a whole house", which turns out to be a commercial promising specification. The failure of 802.11n to achieve this promise can be supported by observing all kinds of wired technologies still used by service providers to deliver video streaming. If 802.11n has achieved the promise, wireless shall be much more convenient and the preferred technology to deploy video steaming around houses.

While MIMO technology of 802.11n has, to some extent, achieve its intended purpose, under some statistic model (that is under average), it is still quite easy to find a house where the video streaming target is not achieved in that the video streaming is not reachable. It is not unusual that some corner around a house even one HD video streaming cannot be achieved. To achieve the promise "to deliver three HD video streaming around whole houses", wireless technology beyond MIMO needs to be further explored.

With the success of a company like Netflix, video steaming around a house has become a reality and the demand to support such service uniformly across all houses is expected to increasingly intensify.

Given the inadequacy of one wireless hop, which includes one pair of wireless access point (AP) and wireless client, it is natural to consider multiple wireless hops between AP and client. The simplest form of two-hop wireless is a half duplex wireless relay (or repeater, extender), which is used to relay received wireless signal. An example of a half-duplex wireless relay system, well known in the art, is shown in FIG. 1. In FIG. 1, the original signal and the relayed signal usually use the same RF band in a time sharing manner, which reduces the throughput by half, even though the range could be extended.

In order to remove the penalty of reducing the throughput by half, several challenges must be overcome. First, the RF band (or channel) used for the transmission of the original signal must be different than that used for the relayed signal, otherwise, multiple collision scenarios can happen between different forward and reverse links. Secondly, the self interference generated by the relay node must be removed. The same challenges exist for full duplex wireless systems, where the self interference originates from the transmitted signal to the received signal in the same RF band.

In the case where full duplex is used, in FIG. 1, the original signal and the relayed signal are transmitted and received at different RF bands. FIG. 2 shows a high level block diagram of a prior art full duplex wireless system including a transmitter and a receiver. The receiver receives an RF signal from an antenna and a RF canceller is used to cancel the self interference from the received RF signal by using an output of a splitter from the transmitter side of the system. The output of the RF canceller is then amplified, using a low noise amplifier (LNA). Next, the output of the LNA is mixed with a low frequency signal to generate a baseband signal from the RF signal and the output of the mixer is filtered using a low pass filter (LPF). Next, a voltage variable gain amplifier (VGA) and serves to amplify the gain of the received signal. Next, the output of the VGA is converted from analog form to digital form, using an analog-to-digital converter (ADC). The output of the ADC is processed by a baseband adaptive canceller, which sends its output to a demodulator (not shown in FIG. 2). The baseband adaptive canceller also receives as another one of its inputs, the output of the modulator.

On the transmitter side, a digital-to-analog converter (DAC) receives the output of the modulator and converts it to analog form. The output of the DAC is then amplified using the baseband amplifier and up to this point, the signal is at baseband. Next, a mixer converts the frequency of the signal at the output of the baseband amplifier to RF and passes it onto a power amplifier (PA), which amplifies the signal and sends it to the splitter. The splitter splits the output of the PA to provide one of the splitter outputs to the RF canceller in the receiver, as previously discussed, and to provide the other output to the antenna. Of particular noteworthiness is the cancellation of self interference at RF, which poses the problems discussed above.

A copy of the amplified RF signal, generated by the splitter in FIG. 2, is fed into the receive path for RF self interference cancellation. The receive path consists mainly of gain control and phase adjustment which are used to duplicate the self interference received from the transmitting antenna that is coupled back to the receiving antenna.

In full duplex wireless systems, because the signal is at a high frequency, linearity is difficult to maintain. Also, SNR is low, which also makes full duplex wireless systems difficult to achieve.

What is needed is a method and apparatus to cancel self interference when a transmitted and received signal use different (but usually nearby) RF band, thus the term generalized full duplex wireless.

IN THE DRAWINGS

FIG. 4(*a*) shows further details of the device 40, or 142 or 144.

FIG. 4(*b*) shows further details of the device 36, or 136 or 140.

FIG. 10(*b*) shows sharing of transmit and receive antennas in the case where wireless relay over half duplex wireless protocol is employed, such as shown in FIGS. 5 and 8 herein.

FIG. 11(*b*) shows the antenna cancellation systems for FIG. 14 and FIG. 15.

SUMMARY OF THE INVENTION

Figure 1:
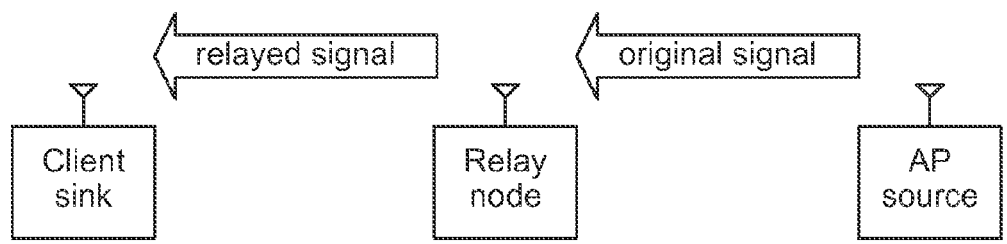
FIG. 1 shows a prior art half-duplex wireless relay system.
Figure 2:
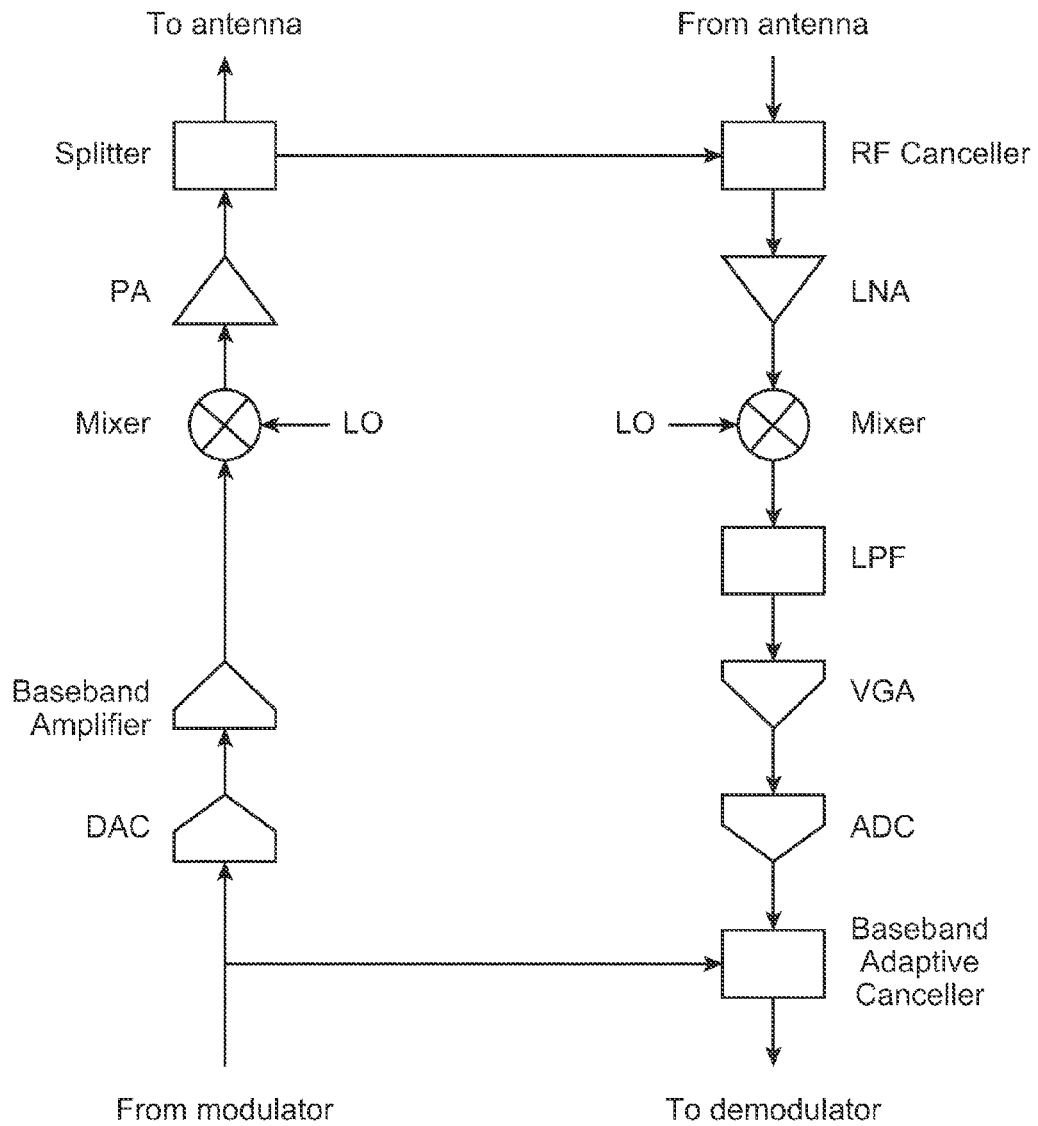
FIG. 2 shows a high level block diagram of a prior art full duplex wireless system including a transmitter and a receiver.

Briefly, an embodiment of the present invention includes a full duplex wireless system is employed for communicating data between an access point and a client. The full duplex wireless system includes a receive path configured to receive radio frequency data, including self interference, from an antenna and generates baseband output to a demodulator, the receive path includes a combiner that combines the received radio frequency with a self interference canceller path output to generate a combiner output. Further, a self interference tracking path is configured to receive the combiner output and to generate a self interference tracking path output, the self interference tracking path converts the combiner output to baseband and tracks the self-interference. Additionally, a self interference canceller path receives the self interference tracking path output and generates the self interference canceller path output that is at radio frequency (RF).

These and other objects and advantages of the present invention will no doubt become apparent to those skilled in the art after having read the following detailed description of the preferred embodiments illustrated in the several figures of the drawing.

DETAILED DESCRIPTION OF VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention. It should be noted that the figures discussed herein are not drawn to scale and thicknesses of lines are not indicative of actual sizes.

Basically, there are two self cancellation loops, one is in RF for coarse interference cancellation the other is in baseband for fine interference cancellation. In accordance with various embodiments of the present invention, two baseband learning loops are employed for both coarse (RF) and fine (baseband) interference tracking, the cancellation of coarse and fine interference conducted in RF and baseband, respectively. The benefits of this technique include better interference cancellation because of adaptive RF tracking through baseband and easily extendibility to MIMO cases because the self interference matrix of MIMO is handled in baseband.

Figure 3:
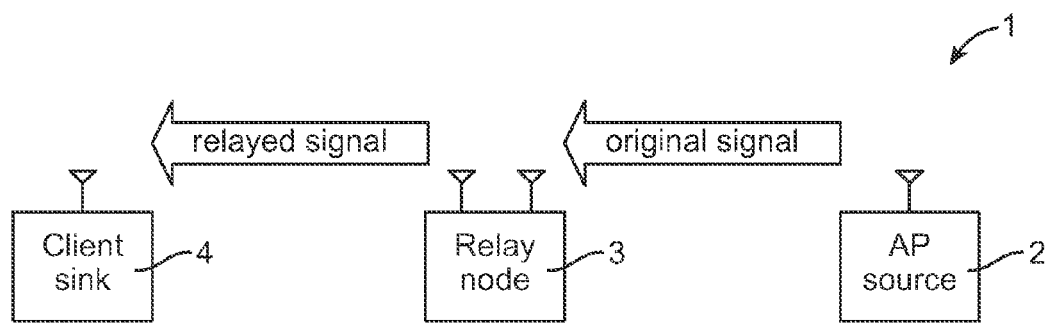
FIG. 3 shows a full-duplex wireless relay system 1, in accordance with an embodiment of the present invention.

An example of a full-duplex wireless relay system 1 is shown in FIG. 3. The system 1 is shown to include an access point (AP) 2, in communication with a relay node 3 to transmit an original signal thereto. The relay node 3 is shown to include multiple antennas and receives the original signal through the same and transmits the received signal to the client sink 4 as relayed signal. The AP is a wireless local area network (LAN) access point, as an example. The relay node 3, in an exemplary application, is a wireless repeater and the client sink 4, in an exemplary application is a wireless LAN client such as a smart phone. The AP 2 is where the original data to be transmitted originates and the client sink 4 is where the data is ultimately destined to be received. The AP source 2, relay node 3 and client sink 4 are typically remote located from one another. In an exemplary application, the AP source 2 is the Internet where, for example, a game is to be downloaded to a smart phone and the client sink 4 is therefore the smart phone. The AP source 2 is the first device the game is to visit before reaching it ultimate destination, the client sink 4. In other exemplary applications, the source where the data originates may be the client sink 4, in for example, situations where an application is to be uploaded from a client's device to the Internet, and the AP source 2 is the destination of the data. A practical application of the latter is where a client uploads its pictures to Facebook from its smart phone in which case the smart phone is still the client sink 4 but it is the source of the data and the AP source 2 is the destination (or sink). In either case, the data travels through the relay node 3. The relay node 3 is used to relay (repeated) the data signal to its final destination.

It is noted that there are two types of full duplex wireless systems will be discussed herein. One such type is wireless transmission between a wireless pair, such as an AP source to a relay node, and the relay noted to the client and the other type is the way in which the relay is conducted. While the AP source and the relay node are communicating, under half duplex mode (for example, from the AP source 2 to the relay node 3), the relay node 3 can communicate with the client sink 4 at the same time (also under half duplex mode). This results in full duplex communication between the sending and receiving of the relay node 3 (also referred to herein as "full duplex wireless relay"). In other embodiments, the full duplex communication between AP source 2 to the relay node 3 or between the relay node 3 to the client sink 4 are shown and (also referred to herein as "full duplex wireless protocol"), which is another type of full duplex communication.

In full duplex communication systems, as will be later discussed in detail, the relay node 3 undesirably introduces self interference, caused by the echo of relayed signal to the reception of the original signal, thereby lowering the signal-to-noise ratio (SNR) of the original signal.

In FIG. 3, due to the simultaneous communications in both directions, the full-duplex wireless relay system 1 has a relay node 3 with two antennas, rather than the single antenna used by the relay node of the prior art system of FIG. 1.

Figure 4:
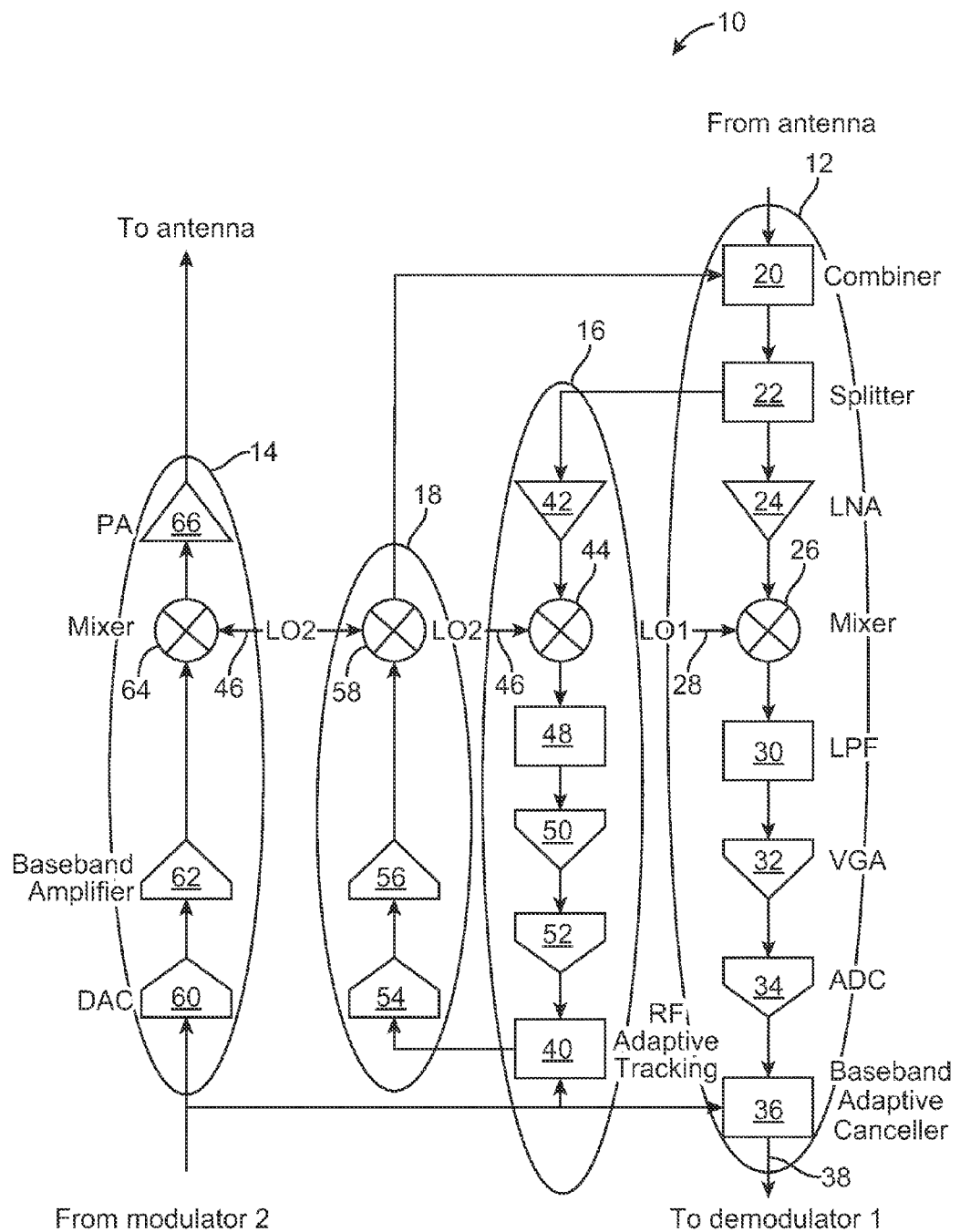
FIG. 4 shows a full duplex wireless system 10, in accordance with an embodiment of the present invention.

FIG. 4 shows a full duplex wireless system 10, in accordance with an embodiment of the present invention. The system 10 is shown to include a receiver path comprising a receiver path 12, a self interference tracker comprising a self interference tracking path 16 and a self interference canceller path 18, and a transmitter path 14. It is noted that the system 10 is used in an environment including a full duplex wireless relay employing half duplex Single-In-Single-Out (SISO) wireless protocol. It is noted that "path", as used herein refers to a device or its equivalent.

The receiver path 12 is shown to include a receiver path combiner 12, a receiver path splitter 22, a receiver path LNA 24, a receiver path mixer 26, a receiver path LPF 30, a receiver path VGA 32, a receiver path ADC 34 and a baseband adaptive canceller device 36 that generates receiver output 38 for use by a demodulator, not shown in FIG. 3. The path 16 is shown to include a self interference tracking LNA 42, a self interference tracking mixer 44, a self interference tracking low pass filter (LPF) 48, a self interference tracking VGA 50, a self interference tracking ADC 52 and a self interference tracking RF adaptive tracking device 40. The path 18 is shown to include a self interference canceller mixer 58, a self interference canceller amplifier 56, and a self interference canceller DAC 54. The path 14 is shown to include a transmitter PA 66, a transmitter mixer 64, a transmitter baseband amplifier 62, and a transmitter DAC 60.

In the path 12, the combiner 20 is shown to receive an RF signal from an antenna (not shown) and to combine the received RF signal with the output of the mixer 58, which effectively and substantially cancels the self interference caused by the full duplex wireless relay during transmission of the signal. The output of the combiner 12 is passed on to the splitter 22, which splits the output of the combiner 20 to two signals, one for use by the LNA 42 and another for use by the LNA 24, both of which amplify the output of the splitter 22. The output of the LNA 24 is fed to the mixer 26, which also receives a reference signal 28, at a baseband frequency LO1, and down converts the output of the LNA 24 to baseband. The output of the mixer 26 is provided to the LPF 30 for filtering and the output of the LPF 30 is amplified by the VGA 32. The output of the VGA 32 is provided to the ADC 34 for conversion to digital form and upon conversion, fed to the canceller 36. The canceller 36 is an adaptive filter that serves to remove the correlation of its two inputs, i.e. the output of the ADC 34 and the input from the modulator 2, from the output of the ADC 34 to generate an output provided to the demodulator 1. Because the frequency (LO2) of the reference signal 46 is distinctly different than the frequency (LO1) of the reference signal 28, the output of the modulation, in this case, the modulator 2, needs to be converted by LO2−LO1 (the difference between the frequencies of the reference signal 46 and the reference signal 28) before the modulator output can be correlated with the output of the ADC 34. The output of the canceller 36 is provided to the demodulator for demodulation. The canceller 36 also receives another input, which is from a modulator that operates in conjunction with the demodulator to which the output 38 goes.

The DAC 60 is shown to receive the output of the modulator and converts the same to analog form. The output of the DAC 60 is shown provided as input to the amplifier 62 for amplification thereof. The output of the amplifier 62 is provided as one of the mixer 64's input. The other input to the mixer 64 is the reference signal 46, at a frequency LO2, which is a frequency to which the output of the amplifier 62 is converted in RF band. The mixer 64 performs such a conversion and provides the output to the PA 66, which amplifies the output of the mixer 64 and provides the amplified signal to the antenna for transmission.

In the path 18, the DAC 54 converts the output of the device 40 to analog form and provides the same to the VGA 56 for amplification and upon amplification, the analog signal is provided to the mixer 58, whose other input is the signal 46. The mixer 58 up converts the output of the VGA 56 to RF and provides the same to the combiner 20. The output of the mixer 58 is the self interference to be cancelled from the receiver path. The RF modulated signal is amplified by the PA 66, in RF domain, and transmitted to the antenna.

In the path 16, the LNA 42 receives the output of the splitter 22 and amplifies the same and provides the same to the mixer 44, which mixes the output of the LNA 42 with the signal 46 to down convert the output of the LNA 42 to baseband and to provide the same to the BPF 48 for filtering. Upon filtering, the output of the BPF 48 is provided as input to the VGA 50, which amplifies the same and provides the amplified signal to the ADC 52 for conversion to digital form. The output of the ADC 52 is provided as input to the device 40, which receives another input, as previously indicated, from the modulator. The device 40 serves to learn the correlation between its two inputs, i.e. the output of the ADC 52 and the output of the modulator 2, and generates an input to the path 18. Because the paths 16 and 18 use the same frequency, LO2, for their reference signals, i.e. reference signal 46, no conversion of the modulator output's frequency is necessary, unlike that which is required by the device 36.

Path 16 effectively converts the signal to baseband and path 18 effectively causes the self-interference to be cancelled from help by the combiner 20 of the path 12 at RF.

Figure 8:
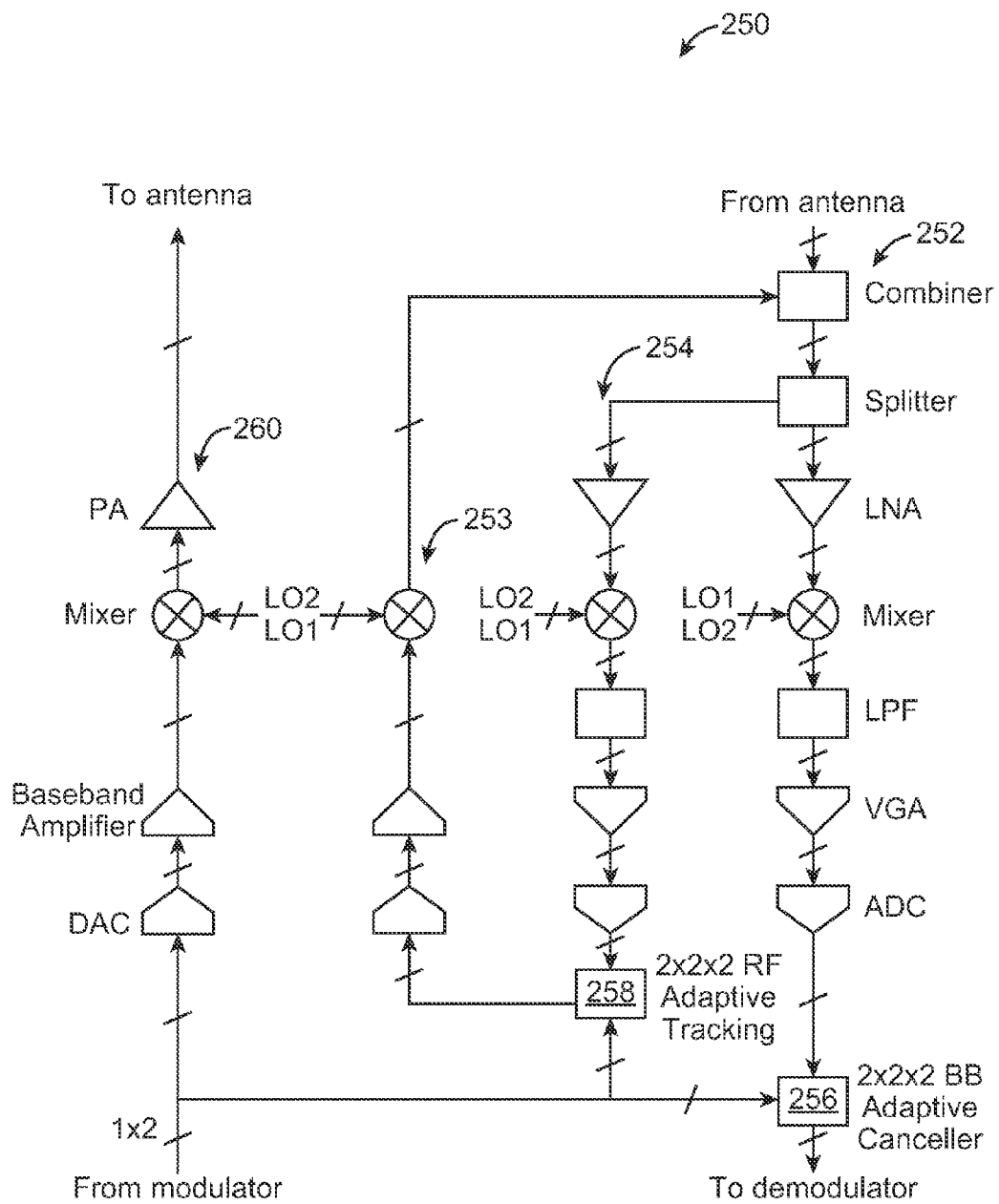
FIG. 8 shows a full duplex wireless relay over half duplex SISO wireless protocol system 250.

It should be noted that the paths shown in FIG. 4 should be practically double because there are two self interference scenarios whereas only one such case is shown in FIG. 4 for the sake of simplicity. That is, FIG. 4 merely shows approximately half of the blocks of the system 10. The other half of the system is obtained by replacing all the subscripts 1 to 2 and vice versa. In FIG. 4, transmission of a channel, i.e. channel 2, is shown interfering with reception of another channel, i.e. channel 1. In FIG. 8, soon to be discussed, transmission of channel 1 interfering with the reception of channel 2 is shown.

The operation of the system 10 is now discussed.

Accordingly, FIG. 4 shows a transmitting path from a modulator to an antenna and a receiving path from the antenna to a demodulator. The path 14 starts with the digital signal, received from the modulator, and going through the DAC 60 (for each of I and Q channels) to generate the analog version of the modulated signal. The digital modulated signal is buffered and used by the device 40, for adaptive tracking and canceling for self interference, in baseband domain, by treating the digital received signal as noise. The adaptive algorithm for tracking and canceling is well known in adaptive filter or echo cancellation literature. In the path 14, the analog modulated signal is then amplified in baseband domain and up-converted to RF domain by the mixer 64 to generate an RF modulated signal.

In the path 16, the estimated self interference included in the signal received is removed by the combiner 12. The residual self interference in path 16 is in RF domain until it is mixed down by the mixer 44 but prior to mixing, it is amplified by the LNA 42. Upon down conversion to baseband, the signal passes through a band selection low pass filter, the LPF 48, so that the out-of-band signal can be reduced. The band selected signal is then amplified by the VGA 50 to provide a suitable signal level to be processed by the ADC 52 (both I and Q channels are converted using two ADCs only one of which is shown in FIG. 3) to generate a digitized version of residual self interference and far end signal, which is further processed by the device 40 to remove the residual self interference.

The signal that is received from the antenna includes far end signal and self interference. For example, in FIG. 4, the far end signal is received by the combiner 20.

Theoretically, the RF modulation must be linear, which means if $M(.)$ is the RF modulation system, and assuming x, y to be two baseband signals and $M(x)$, $M(y)$ to be the corresponding RF signal, then $M(x+y)$ must equal $M(x)+M(y)$. This is not much of a limit because most popular modulation systems these days are linear. The following discussion is directed to such linear systems. Both DAC and ADC discussed herein contain I and Q channels, requiring each DAC and each ADC to process complex signals.

Full Duplex Wireless Relay Over Half Duplex SISO Wireless Protocol:

FIG. 4 shows a block diagram of a full duplex wireless delay over half duplex SISO wireless protocol. Separate transmitting and receiving paths are used and dedicated to RF self interference cancellation, so that adaptive tracking of RF interference becomes possible. Starting with the path 12, the combiner 20 is used to subtract the learned self interference from the received signal (from the antenna), as previously discussed and which typically consists of self interference and far end signal (the originally transmitted signal). The residual interference and far end signal are amplified by both the LNA 24 as well as an extra LNA 42, dedicated for RF interference tracking. The LNA 42 is generally set to low gain because the self interference is typically initially very strong. The amplified signal from the LNA 42 is down-converted to baseband by the mixer 44 and then filtered by band selection filter, LPF 48. The filtered signal is then amplified by VGA 50, which only needs to have a dynamic range to cover the variation of self interference. The amplified signal is then sampled by ADC 52 to generate the digital version of residual interference error. The far end signal is largely removed by the band selection filter in this path. The residual far end signal is considered as noise. The residual interference error is used to train the adaptive filter, the device 40, which uses a signal from the modulator as input as well. Again the adaptive algorithms are well documented, such as the least mean square (LMS) algorithm. The device 40 outputs the learned version of self interference, which is converted to analog, by the DAC 54, amplified, up-converted to RF band and used to remove self interference by the combiner 20. The operation of the paths 12 and 14 are as described above.

When the adaptive filter, in baseband, such as the device 36 or the device 40 have difficulty further reducing the self interference, nonlinear adaptive filter such as adaptive Volterra filter can be used to further improve performance.

It is noted that the LPF 48, in the path 16, is used to remove the originally-transmitted signal, also referred to herein as the "far end signal" so that adaptive training can converge faster. However, if the far end signal can be stopped temporarily during a self interference training mode, the LPF 48 can be removed. In the adaptive training of self interference, after the training converged, the filter updated speed usually will be reduced to very slow so that even large far end signal can be considered as noise which does not affect the adaptive filter coefficients. This is used to reduce complexity, as later discussed. The paths 16 and 18 need to maintain enough linearity and SNR so that self-interference cancellation can be done effectively. In the case of transmission of half duplex wireless protocol, the ADC that is not needed might be optionally reused in the RF tracking path.

Accordingly, FIG. 4 shows a block diagram of a full duplex wireless delay over half duplex SISO wireless protocol. The system 10 advantageously shows a separate transmitting and receiving paths dedicated to RF self interference cancellation, so that adaptive tracking of RF interference becomes possible. In the receive path, path 12, the combiner 20 is used to subtract the learned self interference from the antenna-received signal which typically includes self interference and the far end signal. The residual interference and far end signal are amplified by both the LNA 24 and 42, the latter dedicated for RF interference tracking. The LNA 42 is typically set to low gain because self interference is usually very strong when the signal is initially received. The amplified signal from LNA 42 is down-converted to baseband and then filtered by a band selection filter. The filtered signal is then amplified by VGA 50, which only needs a dynamic range to cover the variation of self interference. The amplified signal is then sampled by ADC 52 to generate the digital version of residual interference error. The far end signal is largely removed by the band selection filter in this path. The residual far end signal is considered as noise. The residual interference error is used to train the adaptive filter, device 40, which uses a signal from the modulator as input. Again the adaptive algorithms are well known, with one being the LMS algorithm. The device 40 outputs the learned version of self interference, which is converted to analog by the DAC 54, amplified by VGA 56, up-converted to RF band by mixer 58 and used to remove self interference in the combiner 20. The remaining portion of FIG. 4 operates in a similar manner as conventional full duplex systems described earlier.

It is noted that, in some embodiments, when the adaptive filter in baseband, such as the device 36, has difficulty in further reducing the self interference, nonlinear adaptive filter, such as an adaptive Volterra filter, can be used to further improve the performance of system 10.

Figure 4A:
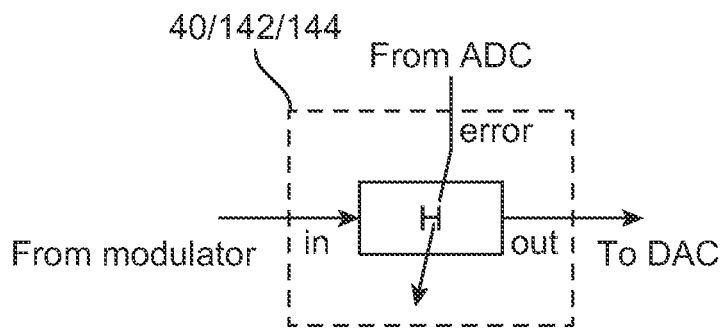

The relation of RF adaptive tracking and baseband adaptive canceller, path 18, to the device 36 are shown in FIG. 4(a).

The LPF 48 in the path 16 is used to remove the far end signal so that adaptive training can converge faster. However, in some embodiments where the far end signal can be stopped temporarily during a self interference training mode, the band selection filter can be removed. In the adaptive training of self interference, after the training converged, the filter updated speed usually will be reduced to very slow so that even large far end signal can be considered as noise which will not affect the adaptive filter coefficients. In subsequent embodiments, shown in figures to be discussed herein, this property reduces complexity. The tracking and cancellation paths 16 and 18 need to maintain enough linearity and SNR so that the cancellation can be done effectively. When transmitting half duplex wireless protocol, the ADC that is not needed might be reused in the RF tracking path.

As previously noted, FIG. 4 shows about half of the channel blocks of the system 10. The other half can be obtained by replacing all the subscripts 1 to 2 and vice versa. A more complete block diagram of the system 10 is shown in FIG. 8.

FIG. 4(a) shows further details of the device 40, or 142 or 144. The device 40/142/144 is shown to receive an input from the modulator and uses the input it receives from the ADC, as error, to correlate with modulator input by adjusting filter coefficients (H) with LMS algorithm and outputting the learned self interference to the DAC. The ADC, in FIG. 4, is the ADC 52 and the DAC in FIG. 4 is the DAC 54.

Figure 4B:
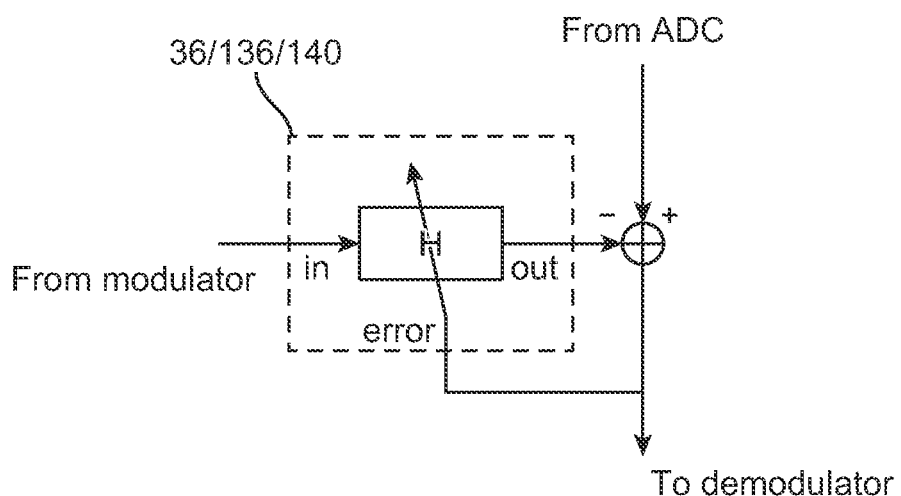

FIG. 4(b) shows further details of the device 36, or 136 or 140. The device 36/136/140 is shown to receive an input from the modulator and uses another input it receives from the ADC, subtracting filter output to generate error, which then correlate with modulator input by adjusting filter coefficients (H) with LMS algorithm and outputting the learned self interference. The input receives from the ADC after subtracting filter output, the learned self interference, is outputting to demodulator. The ADC, in FIG. 4(b), can be regarded as the ADC 52 and the DAC in FIG. 4(b) is the DAC 54 in FIG. 4.

Full Duplex Wireless Relay Over Half Duplex 2T2R MIMO Wireless Protocol

Figure 5:
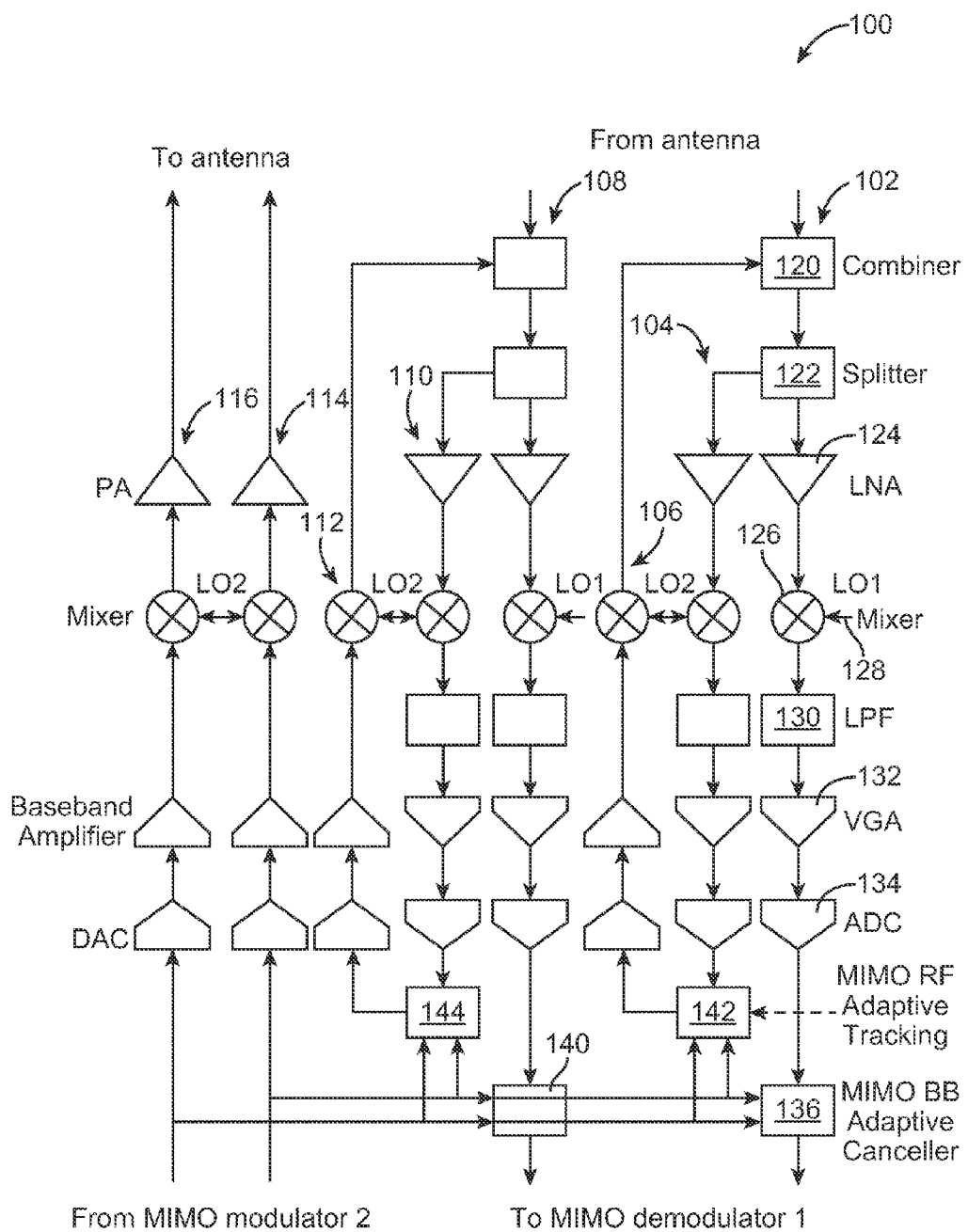
FIG. 5 shows a full duplex wireless system 100, in accordance with another embodiment of the present invention.

FIG. 5 shows a block diagram of a full duplex wireless over full duplex single-input-single-output (SISO) wireless protocol system 100, in accordance with another embodiment of the present invention. The system 100 is employed in an application using full duplex wireless relay in a half duplex two transmitter and two receiver (2T2R) MIMO wireless protocol. The receiver path 102, the self interference tracking path 104, and the self interference canceller path 106 are analogous to the path 12, the path 16 and the path 18, respectively, of FIG. 4. Baseband adaptive canceller device 136 is analogous to the device 36 of FIG. 4 and self interference tracking RF adaptive tracking device 142 is analogous to the device 40 of FIG. 4, similarly, the baseband adaptive canceller device 140 is analogous to the device 36 and the self interference tracking RF adaptive tracking device 144 is analogous to the device 142. Additionally, each of the transmitter path 114 and the transmitter path 116 is analogous to the path 14 of FIG. 4.

There are two main differences between system 10 of FIG. 4 and system 100 of FIG. 5. Firstly, because of the two receivers in MIMO, there are two receiving paths, paths 102 and 108, in FIG. 5 with two extra RF tracking and cancellation paths, paths 104 and 106 and paths 110 and 112. Secondly, both of the baseband and RF adaptive filters, the devices 136-144 each have two modulated signals, as inputs from the MIMO modulator. Note that the extra transmitting signal in the MIMO case does not increase the number of RF cancellation paths different self interference with the same carrier frequency has been combined in baseband. The system 100 also shows that full duplex and MIMO are compatible techniques.

Note that full duplex wireless relays in FIGS. 4 and 5 both use half duplex wireless as underlying protocol. Almost all commercial wireless systems are half duplex wireless protocol. A full duplex wireless relay can be plugged into the middle of an AP and client device to extend range for a given throughput without changing standards. This is important from a marketing perspective. However, the underlying wireless protocol can be changed into full duplex with GFD technology as well in accordance with various embodiments of the present invention. That will explore the full potential of the technique to wireless communication. Full duplex wireless relay over full duplex wireless protocol starting will now be discussed starting with the SISO case.

Similar to FIG. 4, FIG. 5 shows approximately half of the blocks for simplicity but in reality, as discussed earlier two self interference scenarios required two sets of hardware.

Full Duplex Wireless Relay Over Full Duplex SISO Wireless Protocol

Figure 6:
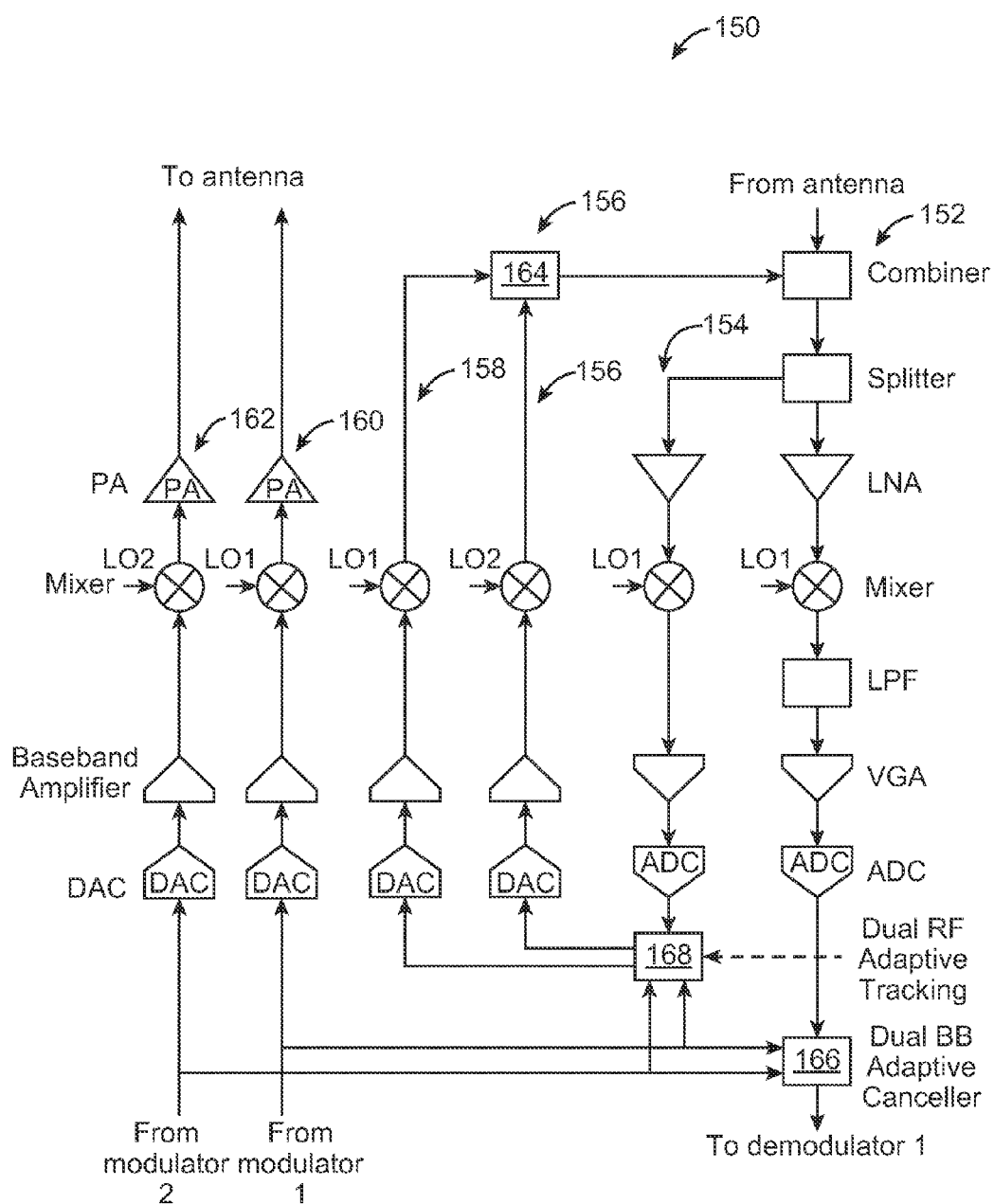
FIG. 6 shows a full duplex wireless system 150, in accordance with yet another embodiment of the present invention.

FIG. 6 shows a full duplex wireless system 150, in accordance with yet another embodiment of the present invention. FIG. 6 is analogous to FIG. 4 except that the system 150 of FIG. 6 is a full duplex wireless relay using a full duplex SISO wireless protocol.

In FIG. 6's system 150 is shown to include a receiver path 152, analogous to the path 12 of FIG. 4, and a self interference tracking path 154, analogous to the path 16 of FIG. 4 and self interference canceller paths 158 and 156, each analogous to the path 18 of FIG. 4 and that feed into a splitter 164 that is coupled to the combiner of the path 152. Each of the transmitter paths 160 and 162 of FIG. 6 is analogous to the transmitter path 14 of FIG. 4.

As compared to FIG. 4, FIG. 6 shows two SISO transmitting signals to generate self interference to both SISO receiving paths, so both modulated signals, from modulators 1 and 2 (not shown) from SISO are used as inputs to the self interference tracking RF adaptive tracking device 168 and baseband adaptive canceller device 166, which are each analogous to the device 40 and 36, respectively. Secondly, two extra tracking paths, i.e. paths 156 and 158 are required for every receiving path, path 152, because the tracking loops need to work on self interference of different carrier frequency. The reason for only having one extra tracking path, while with two extra cancellation paths, is because of the following observation to combine two tracking paths for complexity reduction. If the band selection filter is removed, the self interference of both SISO will be brought down to baseband with some frequency offset which corresponds to carrier offsets of two SISO systems. The ADC will get an alias version of the residual self interference which can be processed in baseband by simply conducting frequency shift. It is again noted that the far end signal that gets into the RF tracking path slows down the convergent speed of adaptive filters. However with the full duplex protocol, a self interference training mode can be introduced to speed up the convergence of adaptive filter whenever needed. Thus, two extra RF tracking paths have been combined into one. Note that two extra RF cancelling paths are combined after up-converters before cancelling the interference in the target receiving path.

Full Duplex Wireless Relay Over Full Duplex 2T2R MIMO Wireless Protocol

Figure 7:
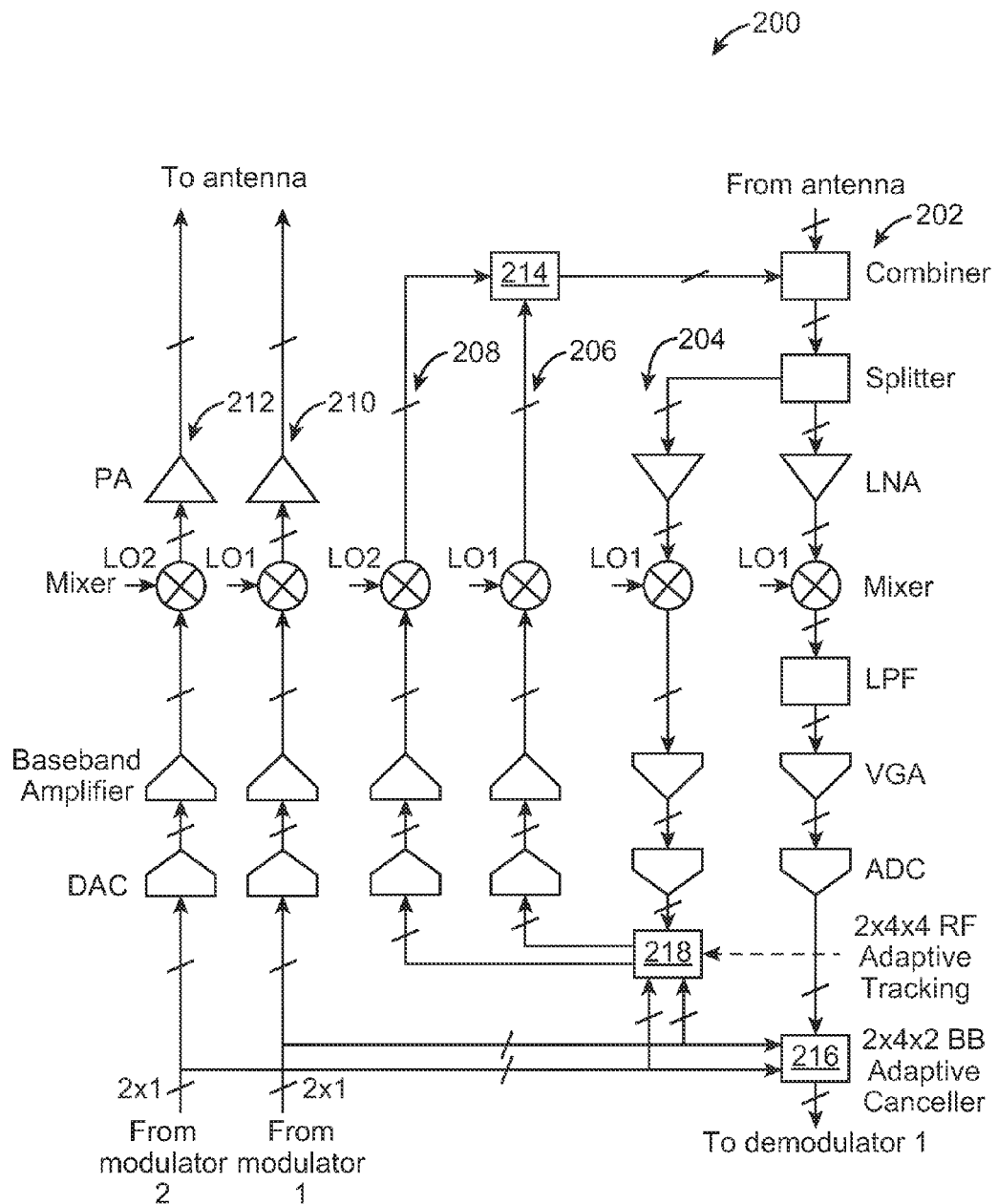
FIG. 7 shows a full duplex wireless system 200, in accordance with yet another embodiment of the present invention.

FIG. 7 shows a full duplex wireless relay over full duplex 2T2R MIMO wireless protocol system 200, in accordance with another embodiment of the present invention. "2T2R" represents two transmitters and two receivers. The system 200 is analogous to the system 150 except that the self interference tracking RF adaptive tracking device 218 is a 2×4×4 RF adaptive tracking device and the signals are carried on busses that are 2×1 with signals duplicated to account for the 2T2R configuration and baseband adaptive canceller device 216, which is analogous to device 166 is 2×4×2, as opposed to a dual channel, such as the device 166. Duplicated signals are each modulated by the same carrier frequency (or "reference frequency" as used herein). In FIG. 7, as in many of the figures herein, the system 200 is only shown to include about half of the blocks it actually includes for two scenarios of self interference.

Using a similar bus notation as that of FIG. 7, FIG. 8 is shown to include the missing blocks of FIG. 4 in that a notation of "1×2" indicates that the extended buses are associated with two different carrier frequencies. That is, FIG. 8 shows a full duplex wireless relay over half duplex SISO wireless protocol system 250, analogous to FIG. 4 except showing the signals being 1×2 rather than a single signal, as shown in FIG. 4. It is noted that two self cancellations scenarios are all shown in FIG. 8.

Figure 9:
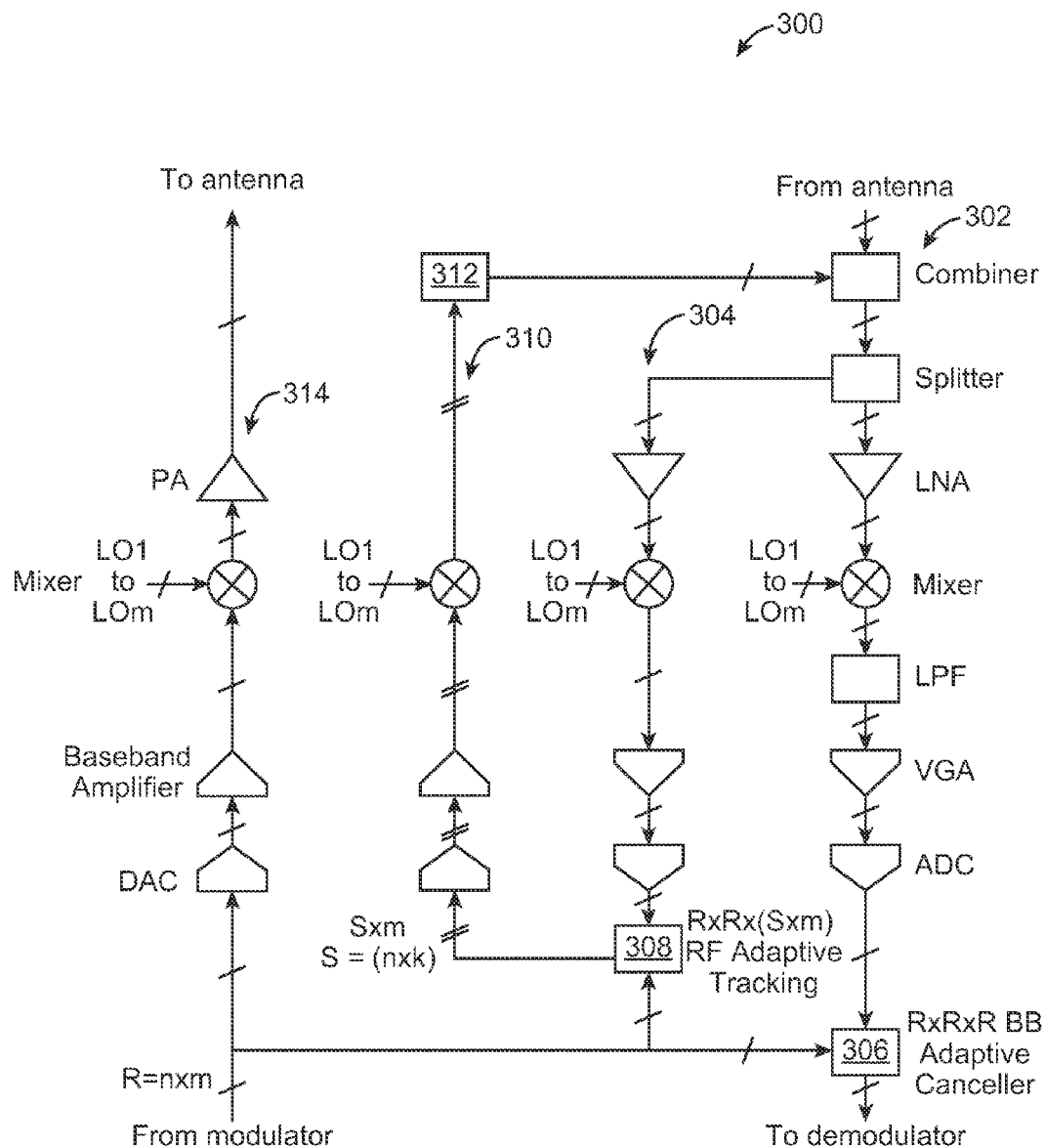
FIG. 9 shows a general GFD wireless system 300, in accordance with an embodiment of the present invention.

Generalized Full Duplex (GDF) Wireless:

Now GFD wireless systems will be shown and described after presenting some background regarding the same. Given an m-way full duplex wireless switch, with 'm' being an integer number, (when m is 2 the system degenerates to a relay) over nTnR MIMO wireless protocol. Assuming k=m, when full duplex wireless protocol is employed, and k=m−1 when half duplex wireless protocol is employed. FIG. 9 shows a general GFD wireless system 300, in accordance with an embodiment of the present invention. The system 300 is shown to include the paths 302, 304, 310 and 314, analogous to the paths 12, 16, 18 and 14 of FIG. 4, respectively, except that the combiner 312, in FIG. 9 is shown to receive the output of the mixer of the path 312 and to generate an output for use by the combiner of the path 302. The combiner 312 serves to collect all the outputs of the mixers. Also, the system 300 of FIG. 9 is generic full duplex wireless system, which is the reason its device 306 is shown to be a baseband adaptive canceller of R×R×R, with "R" being equal to n×m. Similarly, the device 308 of FIG. 9 is an R×R×(S×m) RF adaptive tracking device, such as the device 40 of FIG. 4 except that the device 40 of FIG. 4 is a single RF adaptive tracking device with the inputs shown in FIG. 4 and the device 308 is an R×R×(S×m) device with multiple inputs, namely n×m, being received from the modulator and multiple inputs being received from the ADC of the path 304 and generating S×m outputs to the DAC of the path 310 with "S" being equal to n×k.

It is noted that the combiners which convert n×k×m buses into n×m buses, in FIG. 9, such as the combiner of the path 302, each combine k buses that are generated by RF tracking filters adapted by the same residual interference error. The reason those k signals carried by the k buses cannot be combined in baseband is because of the k different carrier frequencies. If the m carriers are restricted to be adjacent channels and the DAC bandwidth is made to be wide enough to cover m channels, then the k signals can be combined in baseband by using frequency shifting operation. This technique can be used to reduce complexity.

GFD Wireless with Antenna Cancellations:

In the case where transmitting antennas are doubled, an antenna cancellation apparatus and method is employed in accordance with various embodiments of the present invention, as will follow. Antenna cancellation is controlled through baseband to further reduce the interference. The approach can be applied to all GFD systems with proper extension on transmitting path.

Figure 10A:
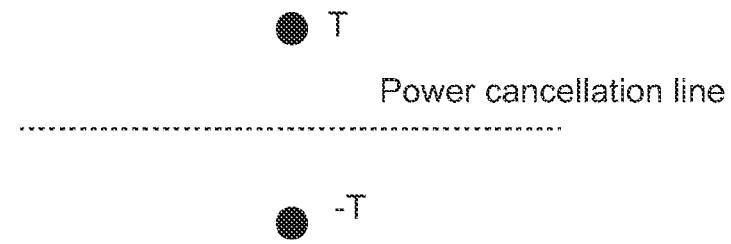
FIG. 10(*a*) shows the general scheme of how to use two transmitting antenna for interference cancellation.
Figure 10B:
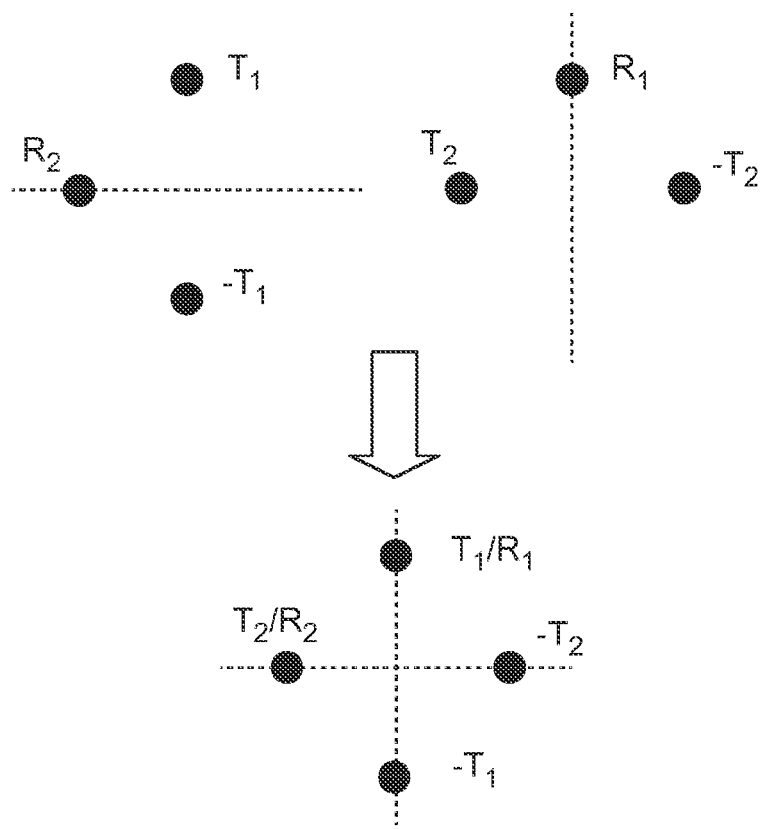
Figure 12:
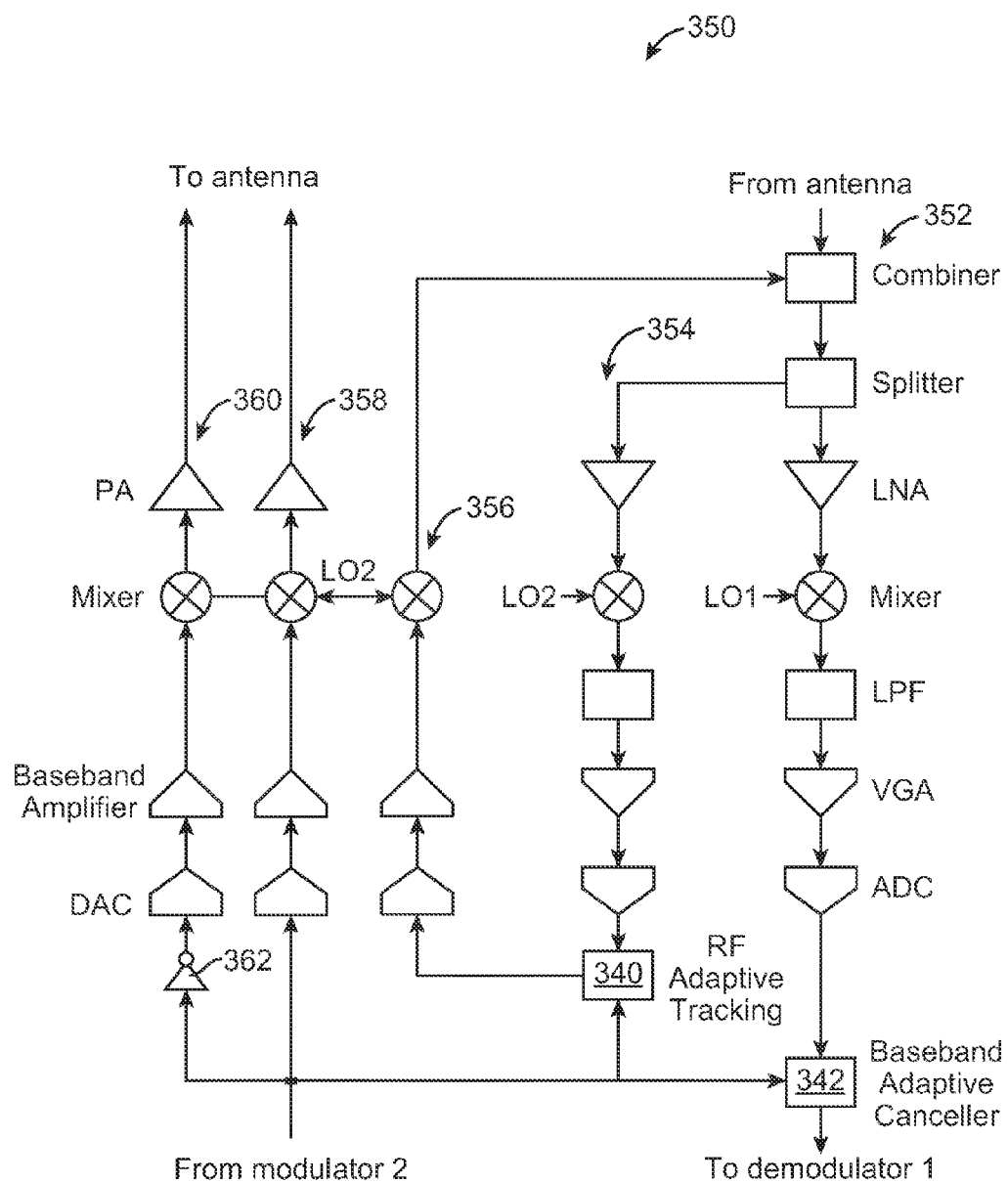
FIG. 12 shows a full duplex wireless relay over half duplex 2T1R wireless protocol system 350, in accordance with another embodiment of the present invention.

FIG. 10(a) shows the general scheme of how to use two transmitting antenna for interference cancellation. A power cancellation line is a perpendicular line through the middle between two transmitting antennas sending the same but opposite sign of signal, "T" and "−T" (that is both signals are 180 degree off). A RF signal with an opposite sign can be constructed by simply negating the signal in baseband or in RF. FIG. 10(b) shows sharing of transmit and receive antennas in the case where wireless relay over half duplex wireless protocol is employed, such as shown in FIGS. 4 and 8 herein. If baseband inversion is used, FIG. 10(a) is the antenna cancellation system of full duplex wireless relay over half duplex 2T1R wireless protocol as shown in FIG. 12. If RF inversion is used, FIG. 10(b) is the antenna cancellation system of full duplex wireless relay over half duplex SISO wireless protocol as shown in FIG. 4.

Figure 11A:
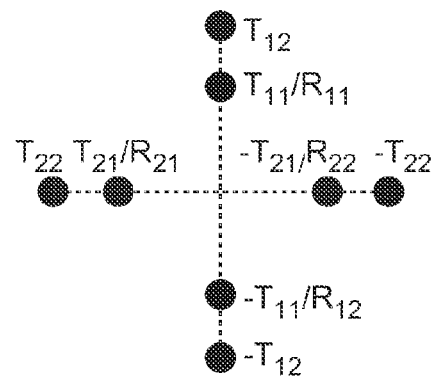
FIG. 11(*a*) shows the antenna cancellation system for modified second GFD example as shown in FIG. 13, which is now full duplex wireless relay over half duplex 4T2R wireless protocol.
Figure 11B:
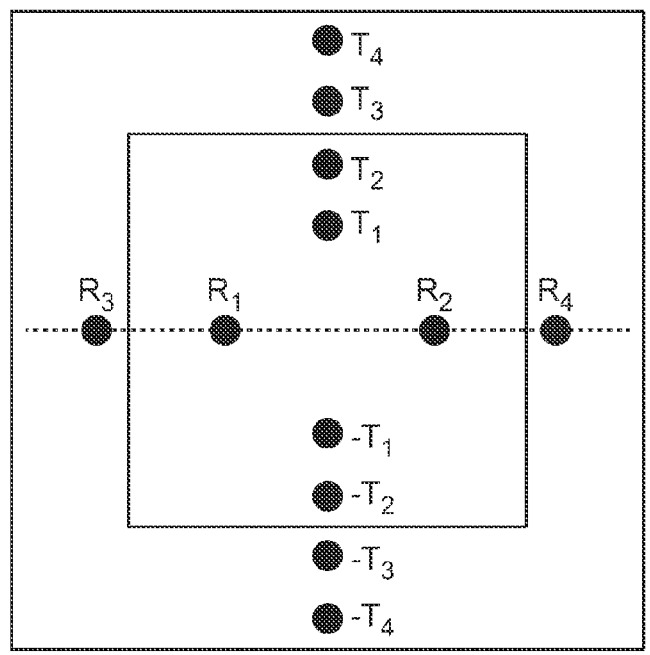
Figure 13:
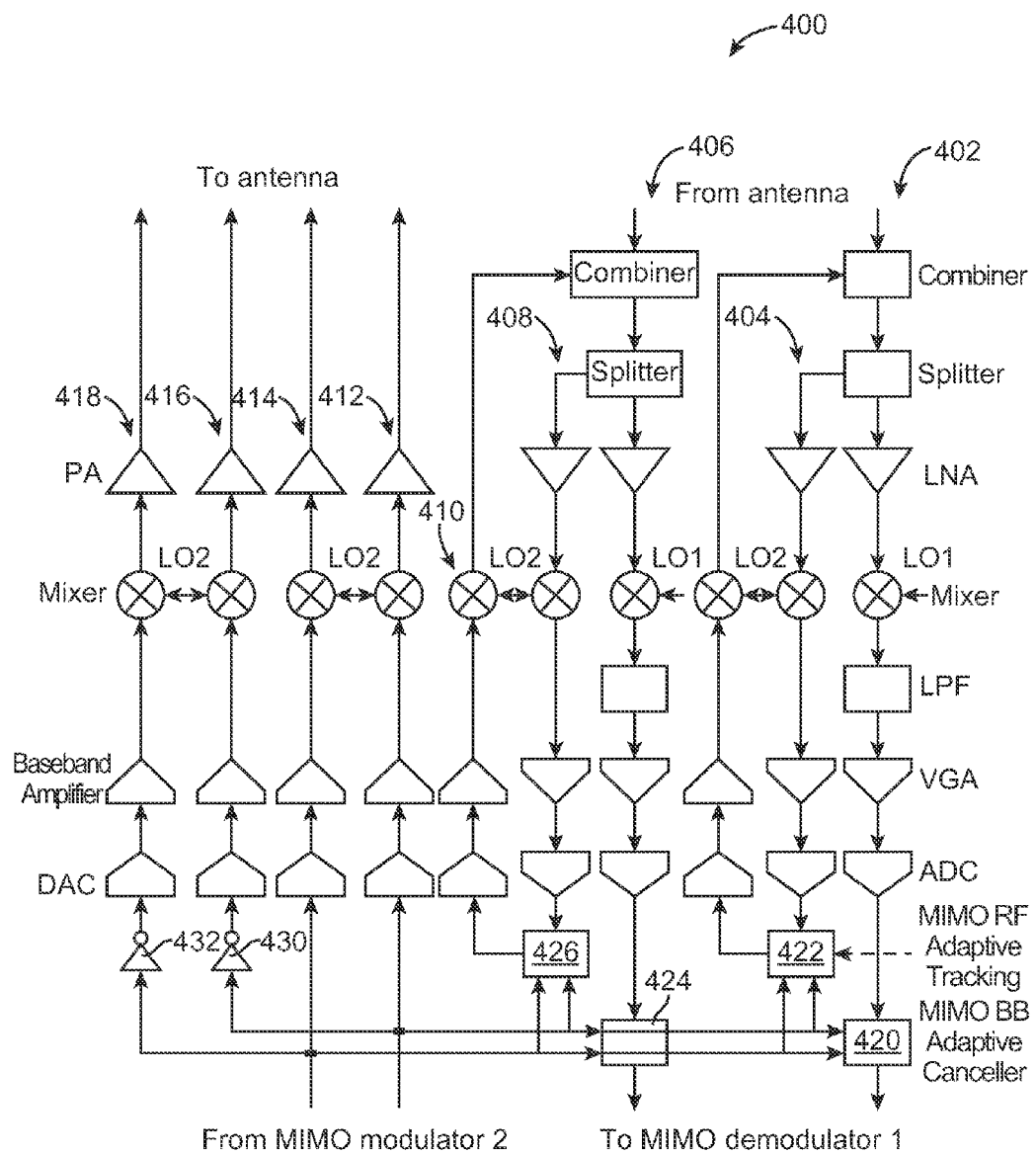
FIG. 13 shows a full duplex wireless relay over half duplex 4T2R wireless protocol system 400, in accordance with another embodiment of the present invention.

In the case where baseband inversion is used, FIG. 11(a) shows the antenna cancellation system for modified second GFD example as shown in FIG. 13, which is now full duplex wireless relay over half duplex 4T2R wireless protocol. If RF inversion is used, FIG. 11(a) is the antenna cancellation system of full duplex wireless relay over half duplex 2T2R wireless protocol as shown in FIG. 5. In the case where baseband inversion is used, FIG. 11(b) shows the antenna cancellation systems for FIG. 14 and FIG. 15. In the case where RF inversion is used, FIG. 11(b) shows the antenna cancellation systems for FIG. 6 and FIG. 7. Note that under full duplex wireless the transmitting and receiving antennas cannot be shared. The generalization of such antenna cancellation scheme can be generated from FIG. 11(b).

FIG. 12 shows a full duplex wireless relay over half duplex 2T1R wireless protocol system 350, in accordance with another embodiment of the present invention. System 350 is shown to include paths 352, 354, 356, and 358, analogous to the paths 12, 16, 18 and 14 of FIG. 4, respectively. The system 350 includes an additional transmit path 360 because it is a 2T1R (two transmitter and one receiver) system and to this end, the input from the modulator 2 is inverted before being provided as an input to the 360 and 358 paths, in this case the path 360 receives an inverted input from the inverter 362, which inverts the input received from the modulator 2. It is understood that in other designs, the path 358 can receive an inverted modulator input rather than the path 360.

FIG. 13 shows a full duplex wireless relay over half duplex 4T2R wireless protocol system 400, in accordance with another embodiment of the present invention. The system 400 is analogous to the system 250 of FIG. 8 except that the latter is SISO and the system 400 is 4T2R.

Figure 14:
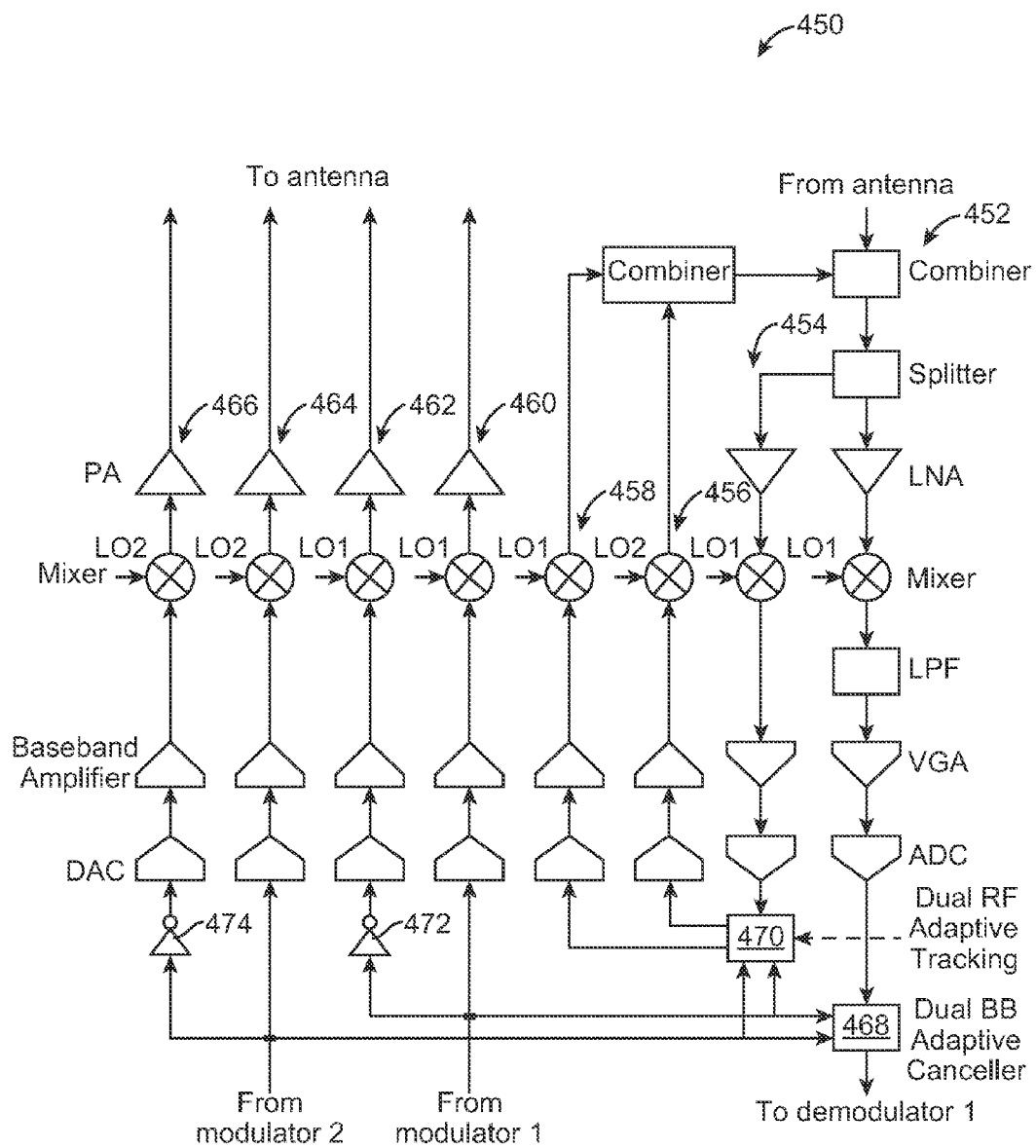
FIG. 14 SHOWS A FULL DUPLEX WIRELESS RELAY OVER FULL DUPLEX 2T1R WIRELESS PROTOCOL SYSTEM 450, IN ACCORDANCE WITH ANOTHER EMBODIMENT OF THE PRESENT INVENTION.

FIG. 14 shows a full duplex wireless relay over full duplex 2T1R wireless protocol system 450, in accordance with another embodiment of the present invention. The system 450 is analogous to the system 200 of FIG. 7 except that the system 450 is 2T1R.

Figure 15:
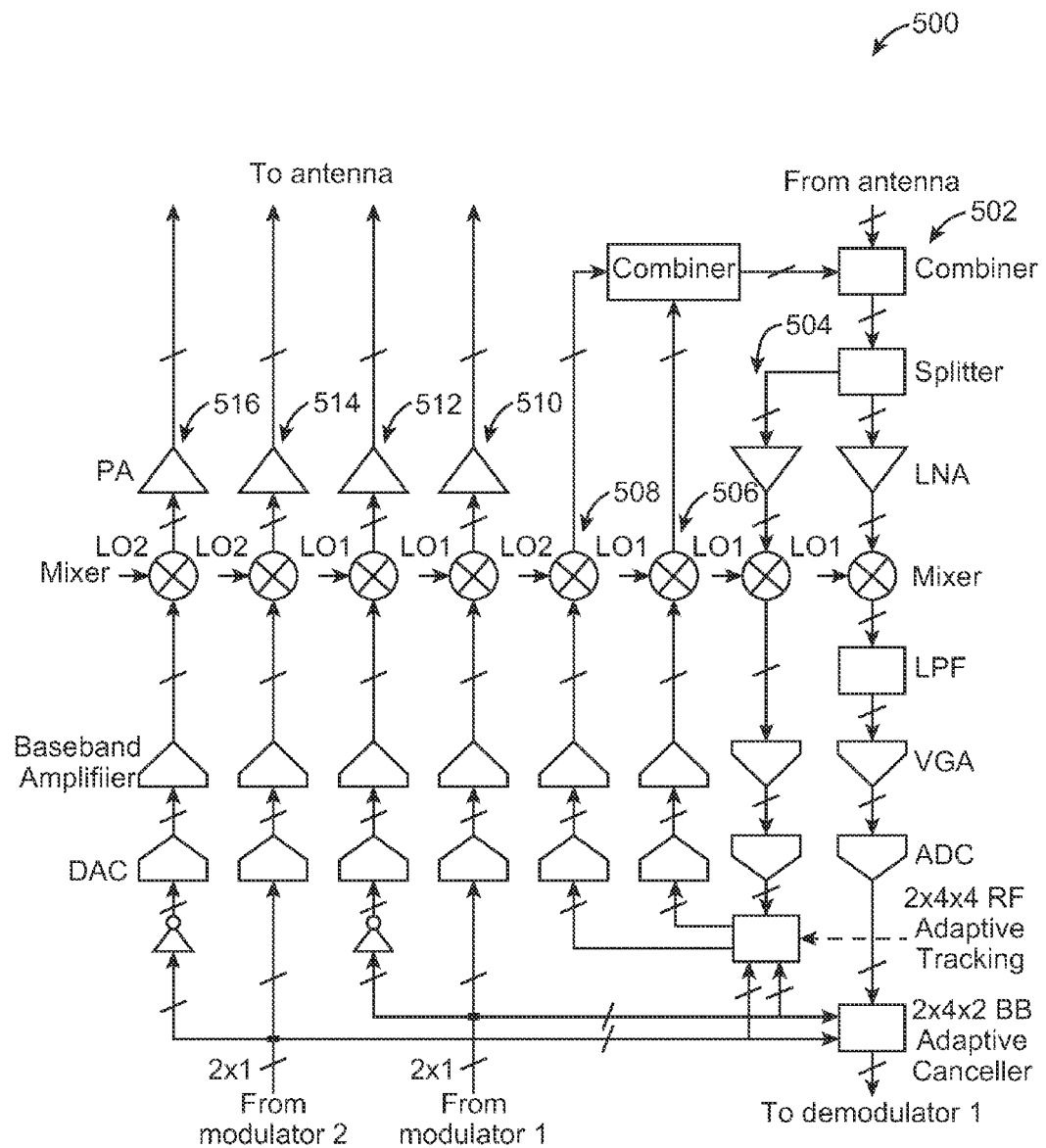
FIG. 15 SHOWS A FULL DUPLEX WIRELESS RELAY OVER FULL DUPLEX 4T2R WIRELESS PROTOCOL SYSTEM 500, IN ACCORDANCE WITH ANOTHER EMBODIMENT OF THE PRESENT INVENTION.

FIG. 15 shows a full duplex wireless relay over full duplex 4T2R wireless protocol system 500, in accordance with another embodiment of the present invention. The system 500 is analogous to the system 450 except that it is 4T2R instead of 2T1R.

GFD Wireless Applications:

In previous sections, wireless relays are employed in an effort to discuss the GFD wireless systems. However, there are several important applications that can be directly applied. The first example is a multiple radio system. Such system has become more and more common in almost all kinds of major platforms. For examples smart phones always include GPS, 3G, WLAN and Bluetooth; notebooks mostly include both WLAN and Bluetooth; and iPad like device could include GPS, 3G, WLAN and Bluetooth. The GFD wireless technology can be used to the case that multiple radios must operate at the same time, e.g. WLAN has to connect to internet for map database while GPS needs to get current location. The second example is simply a full duplex wireless protocol, in such case m=1 and k=1 in FIG. 8. Full duplex wireless is suitable for a point to point wireless connection, which is ideal to be used as wireless bridge. The third and last example we want to describe is a 3 ways full duplex wireless switch, in such case m=k=3. By using both SISO (that is n=1) or 2T2R MIMO (that is n=2) as underlying wireless protocol, 3 ways full duplex wireless switch can be a very versatile building block for wireless network.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A full duplex wireless system employed for communicating data between an access point and a client comprising:
a receive path configured to receive radio frequency (RF) data, the received RF data including self interference and being received from an antenna, the received path further configured to generate baseband output to a demodulator, the receive path including a combiner operative to combine the received radio frequency with a self interference canceller path output to generate a combiner output;
a self interference tracking path configured to receive the combiner output and to generate a self interference tracking path output, the self interference tracking path operable to convert the combiner output to baseband and to track the self-interference; and
a self interference canceller path configured to receive the self interference tracking path output and to generate the self interference canceller path output that is at RF.

2. The full duplex wireless system, as recited in claim 1, further including a transmitter path configured to receive input from a modulator and to generate an output to the antenna, the input from a modulator being input to the receive path.

3. The full duplex wireless system, as recited in claim 2, wherein the receive path includes a receive path mixer, the self interference tracking path includes a self interference tracking path mixer, the self interference canceller path includes a self interference canceller path mixer and the transmitter path includes a transmitter path mixer where the receive path mixer receives a first reference signal with a first reference frequency and the self interference tracking path mixer, the self interference canceller path mixer and the transmit path mixer each receive a second reference signal with a second reference frequency where the first and second reference frequencies are different.

4. The full duplex wireless system, as recited in claim 3, wherein the first reference frequency is at baseband.

5. The full duplex wireless system, as recited in claim 4, wherein the combiner output includes two signals from a splitter, a first combiner output signal and a second combiner output signal.

6. The full duplex wireless system, as recited in claim 5, wherein the first combiner output signal is amplified to generate a first amplified combiner output and the second combiner output signal is amplified to generate a second amplified combiner output.

7. The full duplex wireless system, as recited in claim 6, wherein the receive path mixer is responsive to the first amplified combiner output and the self interference tracking path mixer is responsive to the second amplified combiner output.

8. The full duplex wireless system, as recited in claim 7, wherein the return path mixer is operable to down convert the first amplified combiner output to baseband to generate a first downconverted return path output.

9. The full duplex wireless system, as recited in claim 8, wherein the first downconverted return path output is filtered and amplified and converted to digital form to generate a first return path digital signal.

10. The full duplex wireless system, as recited in claim 9, wherein the return path further includes a baseband adaptive canceller responsive to the first return path digital signal and operable to adaptively filter the first return path digital signal to remove a correlation of the first return path digital signal and the input from the modulator from the first return path digital signal to generate the baseband output to the demodulator.

11. The full duplex wireless system, as recited in claim 10, wherein the baseband adaptive canceller is operable to filter the input from the modulator using the first return path digital signal as error to generate a filter output and to subtract the filter output from the first return path digital signal.

12. The full duplex wireless system, as recited in claim 9, further including a self interference tracking RF adaptive tracking canceller operable to adaptively filter an output of the self interference tracking path mixer to remove a correlation of the output of the self interference tracking path mixer and the input from the modulator to generate the self interference tracking path output.

13. The full duplex wireless system, as recited in claim 1, further including a second return path, a second self interference tracking path, a second self interference canceller path and a first and a second transmit paths.

14. The full duplex wireless system, as recited in claim 13, wherein the baseband output to the demodulator is multi-input-multi-output (MIMO).

15. The full duplex wireless system, as recited in claim 13, wherein the baseband output to the demodulator is multi-input-multi-output (MIMO).

16. The full duplex wireless system, as recited in claim 13, wherein the first and second transmitter paths are configured to receive input from a multi-input-multi-output (MIMO) modulator and to each generate an output to the antenna, the input from a MIMO modulator is an input to the receive path and the second receive path.

17. A method for communicating data between an access point and a client in a full duplex wireless system comprising:

Receiving a radio frequency (RF) data by a receive path, the received RF data including self interference and being received from an antenna;

the received path further generating a baseband output to a demodulator;

combining the received radio frequency with a self interference canceller path output to generate a combiner output;

receiving the combiner output by a self interference tracking path;

the self interference tracking path generating a self interference tracking path output;

the self interference tracking path converting the combiner output to baseband and tracking the self-interference;

receiving the self interference tracking path output by a self interference canceller path; and generating the self interference canceller path output that is at RF.

* * * * *